United States Patent
Rohart et al.

(10) Patent No.: US 9,216,381 B2
(45) Date of Patent: Dec. 22, 2015

(54) ALUMINA-BASED NITROGEN OXIDE (NOX) TRAPPING COMPOSITIONS AND TREATMENT OF VEHICULAR EXHAUST GASES THEREWITH

(75) Inventors: Emmanuel Rohart, Sainte Soulle (FR); Claire Pitois, Sunbyberg (SE); Kazuhiko Yokota, Kobe (JP); Virginie Belliere-Baca, Andresy (FR); Virginie Harle, Senlis (FR)

(73) Assignee: RHODIA OPERATIONS, Paris (FR)

( * ) Notice: Subject to any disclaimer, the term of this patent is extended or adjusted under 35 U.S.C. 154(b) by 1272 days.

(21) Appl. No.: 12/300,937

(22) PCT Filed: May 7, 2007

(86) PCT No.: PCT/EP2007/054400

§ 371 (c)(1),
(2), (4) Date: Jul. 28, 2009

(87) PCT Pub. No.: WO2007/131902

PCT Pub. Date: Nov. 22, 2007

(65) Prior Publication Data

US 2009/0297416 A1 Dec. 3, 2009

(30) Foreign Application Priority Data

May 16, 2006 (FR) ..................................... 06/04356

(51) Int. Cl.
*B01D 53/56* (2006.01)
*B01D 53/86* (2006.01)
(Continued)

(52) U.S. Cl.
CPC ........... *B01D 53/9422* (2013.01); *B01J 23/002* (2013.01); *B01J 23/10* (2013.01);
(Continued)

(58) Field of Classification Search
CPC ..................... B01D 53/9422; B01D 2258/012; B01D 2255/204; B01D 2255/1021; B01D 2255/2065; B01D 2255/2042; B01J 37/0045; B01J 23/63; B01J 23/10; B01J 23/002; B01J 2523/00; B01J 2523/25; B01J 2523/31; B01J 2523/3712
USPC ......... 502/302–304, 324–328, 330–334, 336, 502/344, 355, 439; 423/235, 239.1, 600, 423/594.1, 594.2, 594.16, 263; 60/299, 60/311; 422/168
See application file for complete search history.

(56) References Cited

U.S. PATENT DOCUMENTS 5,212,130 A 5/1993 Addiego et al.
6,027,706 A * 2/2000 Pinnavaia et al. ............. 423/600
(Continued)

FOREIGN PATENT DOCUMENTS

EP 0 329 302 A2 8/1989
JP 08057312 A * 3/1996
(Continued)

*Primary Examiner* — Anthony J Zimmer

(57) ABSTRACT

Thermally stable, solid alumina-based compositions useful for the trapping of nitrogen oxides that are contained in gaseous fluids, notably in vehicular exhaust gases, are formed of alumina, cerium and a divalent metal M selected from among barium, strontium or an association of these two elements and which include at least 10% of the weight of element M expressed by weight of oxide in contrast to the total weight of the composition and also wherein the aluminate compound of the metal element M, i.e., $MAl_2O_4$, is absent and not detectable by X-ray diffraction of the composition, after calcination thereof with air at 700° C. for two hours.

31 Claims, 1 Drawing Sheet

(51) Int. Cl.

| | |
|---|---|
| *C01B 21/00* | (2006.01) |
| *B01J 23/00* | (2006.01) |
| *B01J 23/10* | (2006.01) |
| *B01J 23/02* | (2006.01) |
| *B01J 23/06* | (2006.01) |
| *B01J 23/08* | (2006.01) |
| *B01D 50/00* | (2006.01) |
| *B01D 53/34* | (2006.01) |
| *F01N 3/00* | (2006.01) |
| *F23J 11/00* | (2006.01) |
| *F01N 3/02* | (2006.01) |
| *B01D 53/94* | (2006.01) |
| *B01J 23/63* | (2006.01) |
| *B01J 37/00* | (2006.01) |

(52) U.S. Cl.
CPC ............. *B01J 23/63* (2013.01); *B01J 37/0045* (2013.01); *B01D 2255/1021* (2013.01); *B01D 2255/204* (2013.01); *B01D 2255/2042* (2013.01); *B01D 2255/2065* (2013.01); *B01D 2258/012* (2013.01); *B01J 2523/00* (2013.01)

(56) References Cited

U.S. PATENT DOCUMENTS

| | | | |
|---|---|---|---|
| 6,120,746 A * | 9/2000 | Takemoto et al. | 423/213.5 |
| 6,413,483 B1 * | 7/2002 | Brisley et al. | 423/239.1 |
| 2004/0138060 A1 * | 7/2004 | Rapier et al. | 502/302 |

FOREIGN PATENT DOCUMENTS

| | | |
|---|---|---|
| JP | 8057312 A2 | 3/1996 |
| WO | 00/61289 A1 | 10/2000 |

* cited by examiner

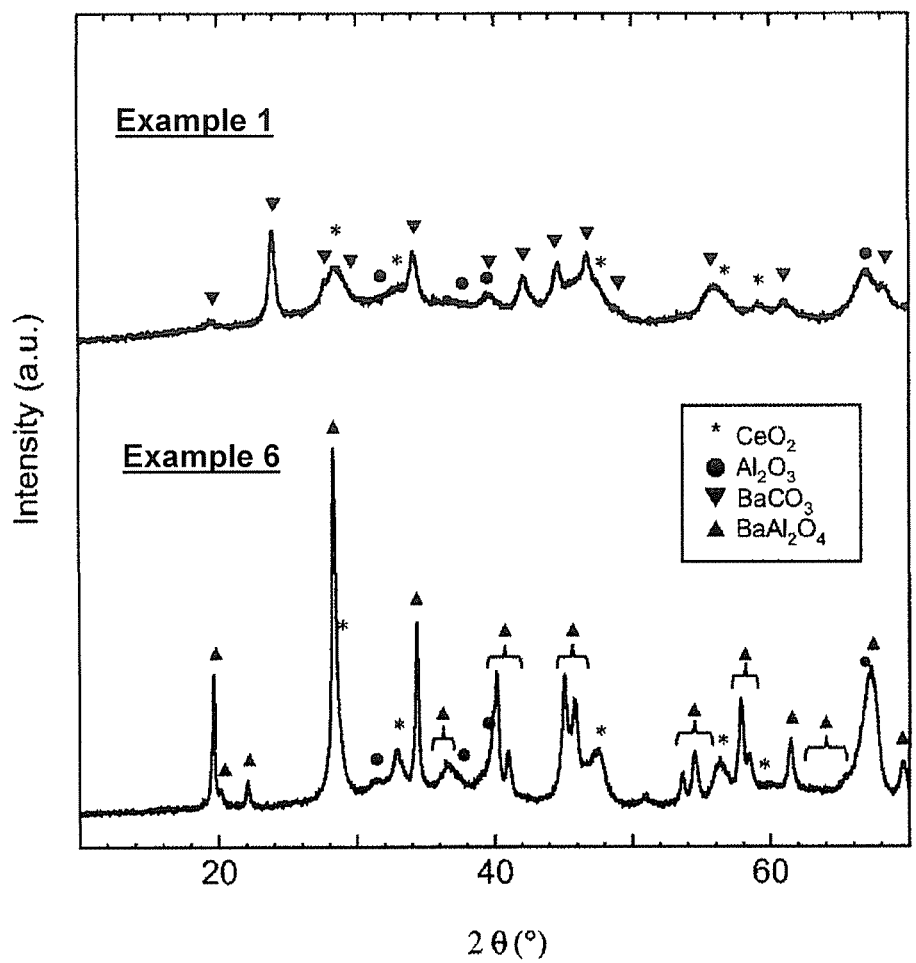

ALUMINA-BASED NITROGEN OXIDE (NOX) TRAPPING COMPOSITIONS AND TREATMENT OF VEHICULAR EXHAUST GASES THEREWITH

CROSS-REFERENCE TO EARLIER APPLICATIONS

This application is a national phase of PCT/EP 2007/054400, filed May 7, 2007 and designating the United States (published in the French language on Nov. 22, 2007, as WO 2007/131902 A2; the title and abstract were also published in English), which claims foreign priority under 35 U.S.C. §119 of FR 0604356, filed May 16, 2006, each hereby expressly incorporated by reference in its entirety and each assigned to the assignee hereof.

The present invention relates to an alumina-based composition for trapping the nitrogen oxides contained in a gaseous fluid.

The invention relates more particularly to a composition that may be used in devices for treating the exhaust gases of internal combustion engines such as petrol engines or diesel engines.

Specifically, environmental protection requires and imposes increasingly strict standards on the treatment of industrial or domestic effluents or discharges.

In particular, in the field of transportation and engines, the tightening of the standards on harmful gaseous discharges imposes the development of efficient and durable catalytic abatement systems, particularly with respect to nitrogen oxides, more particularly NO and $N_2O$, which are referred to hereinbelow by the symbol NOx.

Many solutions have already been proposed for reducing the emissions of nitrogen oxides in the exhaust gases of internal combustion engines, especially petrol engines.

Thus, "three-way" catalysts that can simultaneously reduce the levels of hydrocarbons, CO and NOx have been available for many years.

However, in the case of diesel engines or petrol engines that run on a lean mixture (fuel/oxidant ratio, also known as the richness, less than the stoichiometric ratio), "three-way" catalysts are unsuitable with respect to NOx.

To abate the NOx produced under these oxidative conditions, systems have been proposed comprising an NOx trap. These systems are based on a complex mechanism for which the nitrogen oxides (NO and $NO_2$) are, in a first step, stored—essentially in the form of nitrates on the surface of the catalyst—and then converted into nitrogen in a second step. This conversion is especially obtained by modifying the running regime of the engine so as to increase the richness of the mixture and thus fall into a rich, reductive medium that is favorable for converting the NOx into nitrogen.

The known systems proposed for trapping nitrogen oxides have, however, major drawbacks:
  A temperature-restricted operating domain (operating window). It is considered that a good NOx trapping system should operate optimally between about 200° C. and about 600° C.;
  Insufficient durability, associated with the lack of thermal stability.

The main systems comprise a trapping composition based on alumina and, for example, on barium obtained by impregnating a barium compound on a porous support constituted by alumina. These systems are known for their high capacity for storing NOx essentially when the catalyst is new, but rapidly lose this capacity, thus greatly limiting their use. This phenomenon is proportionately faster the higher the ratio of barium to alumina.

One of the aims of the present invention is to propose a composition that has good stability properties, especially thermal stability, and that can be used in a system for trapping nitrogen oxides with very good efficacy over a very broad temperature range or window, and especially at low temperatures of about 200° C. or even lower.

To this end, the invention proposes a solid composition based on alumina, cerium and a divalent metal M chosen from the group comprising barium, strontium or a combination of these two elements, characterized in that it comprises at least 10% by weight of the element M expressed as weight of oxide relative to the total weight of the composition, and in that the aluminate compound of the metal element M of formula $MAl_2O_4$ is absent, i.e. this compound is not detectable by X-ray diffraction on the composition, after calcination in air of said composition at a temperature of 700° C. for 2 hours.

The absence of compound of formula $MAl_2O_4$ is advantageously a characteristic of the composition of the invention after calcination in air at a temperature of 800° C. for 2 hours, and even more advantageously after calcination in air at a temperature of 900° C. for 2 hours.

According to one characteristic of the invention, the elements cerium and M are present in the composition predominantly in the form of oxide, of carbonate or in the form of a solid solution in alumina. These various forms may be present together in the composition.

Other forms of these elements may be present in minor amounts.

According to one preferred characteristic of the invention, the concentration of element M expressed as oxide is advantageously between 10% and 25% by weight and even more preferentially between 15% and 22% by weight, relative to the total composition.

According to another characteristic of the invention, the concentration of cerium expressed as weight of cerium oxide relative to the total weight of the composition is greater than or equal to 2% and advantageously between 2% and 15% (limits inclusive).

The composition of the invention is characterized in that the various elements of which it is composed are advantageously substantially uniformly distributed in the composition. This uniform distribution may be demonstrated by scanning and/or transmission electron microscopy.

In this respect, SEM/ESD analysis shows the absence of cerium oxide aggregates greater than 100 nm in size. This analysis also reveals finely divided cerium oxide particles interacting with the other components of the composition.

The TEM analysis effectively shows that the cerium oxide particles have a mean size of not more than 10 nm, this size being dependent on the calcination temperature used during the preparation of the product. This particle size of 10 nm is confirmed by XRD analysis of the products calcined at 1000° C. for 2 hours in air and this size, measured by this same technique, may be smaller, for example not more than 7 nm or even, more particularly, not more than 6 nm for products that have been calcined at a lower temperature, for example at 900° C. or 600° C., respectively, for 2 hours in air.

Thus, such a composition cannot be obtained by the standard processes for impregnating one or more oxides, especially oxides of cerium and/or of the element M on a support advantageously constituted by alumina.

On the other hand, all the manufacturing processes, some of which will be described later, for obtaining a solid composition with a substantially uniform distribution of the various metal elements are suitable for use in the present invention.

The expression "absence of aluminate compounds of formula $MAl_2O_4$" should be understood as meaning that the peaks corresponding to the compound $MAl_2O_4$ are absent from the X-ray diffractogram on the composition calcined at a temperature of 700° C. for 2 hours. Thus, when M represents barium, the peaks corresponding to the compound $BaAl_2O_4$ (ICCD-PDF sheet (International Centre for Diffraction Data Powder Diffraction File) No. 730202 acting as the reference) are absent from the X-ray diffractogram obtained.

If the X-ray diffractogram on a composition before use thereof in a system for trapping nitrogen oxides but after calcination in air at 700° C. for 2 hours does not show these peaks and if the composition corresponds to that described previously, this composition is in accordance with the invention.

As demonstrated by the tests described later, the absence of compound or phase corresponding to the structure $MAl_2O_4$ makes it possible to obtain a composition of high specific surface area, after calcination for 2 hours, at 900° C. or 1000° C. Furthermore, the reduction of this specific surface area during the use of the composition in a system for trapping nitrogen oxides is low.

The compositions in accordance with the invention advantageously have a specific surface area of greater than or equal to 80 $m^2/g$ after calcination at 900° C. in air for two hours, and advantageously greater than 90 $m^2/g$. Preferentially, these compositions have a specific surface area of greater than or equal to 70 $m^2/g$ and even more preferentially greater than 80 $m^2/g$ after calcination at 1000° C. in air for two hours.

The term "specific surface area" means the BET surface area determined by adsorption of nitrogen in accordance with standard ASTMD 3663-78 established from the Braunauer-Emmett-Teller method described in the Journal of the American Chemical Society, 60, 309 (1938).

According to a novel characteristic of the invention, the compound M is preferentially barium.

According to another preferential characteristic of the invention, the composition may comprise other metal elements denoted hereinbelow by the letter P.

These metal elements are chosen from the group comprising iron, zirconium, manganese, calcium, potassium, magnesium and rare-earth metals.

The term "rare-earth metals" means the elements belonging to the lanthanide group, including yttrium.

These metal elements may be present in the composition alone or in combination. Advantageously, the metal elements such as iron or manganese may be present alone or in combination to promote the oxidation of NO to $NO_2$. The other elements belonging especially to the lanthanide family may also be present to improve, especially, the thermal stability of the composition.

As preferred metal element P of the invention, mention may be made of lanthanum, praseodymium, neodymium, yttrium, zirconium, iron and manganese, and combinations thereof.

These metal elements are present in the composition predominantly in the form of oxide or carbonate or of a solid solution in alumina and/or cerium oxide. These various forms may be present together in the composition.

This list is given as a guide and is not exhaustive. Thus, any metal element that allows certain properties of the composition of the invention to be improved is suitable for use. However, metal elements that generate toxic compounds or that are themselves toxic to the environment are not desired.

The total weight concentration of elements P and of cerium in the composition is greater than or equal to 5% by weight, advantageously with a concentration of cerium oxide of greater than or equal to 2% of the total composition. These concentrations are expressed as weight of oxide of the elements relative to the weight of the total composition.

Advantageously, the concentration of doping elements P and of cerium is between 5% and 15%, limits inclusive.

The compositions of the invention have a very high capacity for trapping nitrogen oxides at and above a temperature of about 200° C. and over a wide temperature range, for example between about 200° C. and about 600° C. and more particularly between 200° C. and 500° C.

The compositions of the invention may be advantageously used as support for catalytically active elements. Thus, in the case of treating exhaust gases, the catalytically active elements for the oxidation of nitrogen monoxide to nitrogen dioxide are deposited on the surface of the compositions of the invention according to the standard processes for manufacturing supported catalysts.

However, certain compositions of the invention have the property of promoting the oxidation of NO to $NO_2$ in the absence of catalytically active elements described in the preceding paragraph. This property is especially present and efficient when iron and/or manganese are present in the composition. Thus, for such compositions, the catalytically active element may be absent or present in a small amount.

The compositions of the invention may also be combined with other catalytic systems, especially with catalytic systems for reducing nitrogen oxides to compounds that are not toxic or harmful to the environment.

The compositions of the invention may be used in the form of powder, granules or beads, or in the form of extrudates, especially in the form of a honeycomb.

They may also be used as coating for a compact structure especially in honeycomb form that is heat resistant, such as ceramic or metallic structures, or the like. Such a surface coating will be referred to by the term "wash-coat".

As examples of embodiments of the process for manufacturing the compositions of the invention, mention may be made of processes using as starting materials an alumina precursor that will be mixed with soluble compounds or sols or gels of elements M and of cerium.

The term "alumina precursor" means any precursor, for instance boehmite gels which, after calcination in air at between 500° C. and 700° C., will give a compound corresponding to a transition alumina demonstrated by X-ray diffraction.

A first embodiment of the process for obtaining these compositions comprises the following steps:
  a mixture is prepared in liquid medium, containing soluble cerium compounds, an alumina precursor and optionally soluble compounds of the elements M and/or P;
  the mixture is heated;
  the solid formed is recovered and isolated;
  the solid obtained is calcined at a given temperature and for a given time.

The elements M and/or P may be introduced into any step of the process either in the form of soluble compounds or in the form of a gel or colloidal solutions. Thus, in one variant of the process, the elements M and P are introduced into the medium after the step of heat treatment or by heating the cerium/alumina mixture.

The term "soluble compounds of cerium and of the elements M or P" means compounds that are soluble in the liquid solvent used for preparing the mixture. The preferred solvent is advantageously water.

Thus, these compounds may be chosen from the sulfate, nitrate, chloride or acetate of the abovementioned elements. It is also possible, without departing from the context of the invention, to use aqueous gels or sols of these various elements, which are also known as colloidal solutions.

The terms "gel" and "sol" denote any system constituted of fine solid particles of colloidal sizes, i.e. of sizes between about 1 nm and about 500 nm, based on a compound of cerium, of element M or P, this compound generally being an oxide and/or a hydrated oxide suspended in an aqueous liquid phase. Said particles may also optionally contain residual amounts of bound or adsorbed ions, for instance nitrates, acetates, chlorides or ammonium ions. It will be noted that, in such a sol or gel, the elements may be either totally in colloidal form, or in the form of ions and colloids.

It is advantageous to use compounds of high purity, preferably with a purity of at least 99% and more particularly of at least 99.5%.

The aqueous solutions of the compounds of the elements cerium, M and P may have an initial free acidity that may optionally be adjusted by adding a base or an acid. As bases that are suitable for adjusting the free acidity, mention may be made, for example, of aqueous ammonia or hydroxides (sodium hydroxide, potassium hydroxide, etc.), aqueous ammonia being preferred. As acid that is suitable for adjusting the free acidity, mention may be made of nitric acid.

Once the initial mixture is thus obtained, it is then heated, in accordance with the second step of the process according to the invention.

The temperature at which this heating or heat treatment is performed is preferably at least 70° C. and even more particularly at least 100° C. It may thus be between 100° C. and the critical temperature of the reaction medium, in particular between 100 and 350° C. and preferably between 100 and 200° C.

The heating operation may be performed by introducing the liquid medium containing the abovementioned species into a closed chamber (closed reactor of the autoclave type), the required pressure then resulting solely from the heating of the reaction medium (autogenous pressure). Under the temperature conditions given above, and in aqueous media, it may thus be stated, for illustrative purposes, that the pressure in the closed reactor may range between a value of greater than 1 bar ($10^5$ Pa) and 165 bar ($1.65 \times 10^7$ Pa) and preferably between 5 bar ($5 \times 10^5$ Pa) and 165 bar ($1.65 \times 10^7$ Pa). Needless to say, it is also possible to apply an external pressure, which then adds to that following the heating.

The heating may also be performed in an open reactor for temperatures in the region of 100° C.

The heating may be performed either in air, or in an atmosphere of an inert or non-oxidative gas, preferably nitrogen.

The duration of the treatment is not critical, and may thus vary within a wide range, for example between 1 and 48 hours and preferably between 2 and 24 hours. Similarly, the temperature rise takes place at a rate that is not critical, and the set reaction temperature may thus be reached by heating the medium, for example, for between 30 minutes and 4 hours, these values being given entirely as a guide.

After the heating step, a solid product is recovered, which may be separated from its medium by any standard technique of solid-liquid separation, for instance filtration, decantation, draining, centrifugation or atomization. Atomization is the preferred technique.

The product as recovered may then be optionally subjected to washing.

In a final step of the process according to the invention, the recovered solid product is calcined. This calcination makes it possible to develop the crystallinity of the product obtained, and it may also be adjusted and/or chosen as a function of the subsequent working temperature reserved for the composition according to the invention, taking into account the fact that the specific surface area of the product is proportionately lower the higher the calcination temperature used. Such a calcination is generally performed in air, but a calcination performed, for example, in an inert gas or in a controlled atmosphere (oxidative or reductive) is obviously not excluded.

In practice, the calcination temperature is generally limited to a range of values of between 300° C. and 1000° C.

The compositions of the invention may be obtained according to a second process variant that also consists in forming a mixture, in a liquid medium, of soluble compounds of cerium, element M and optionally element P, with an alumina precursor.

The mixture is advantageously directly dried, preferably by atomization. The solid product recovered, after optional washing, is calcined in air under conditions similar to those indicated for the first embodiment.

As in the first embodiment, gels or sols of the elements cerium, M or P may be used instead of the soluble compounds.

In these processes, the starting mixture may, without preference, be obtained either from compounds that are initially in solid form, which will be introduced thereafter in a water stock, or directly using aqueous solutions of these compounds, followed by mixing, in any order, of said solutions.

As indicated previously, the compositions of the invention are generally combined with a catalytic element whose primary function is to promote the oxidation of NO to $NO_2$. These elements are known, and are generally metals and more particularly precious metals. The term "precious metals" means gold, silver and platinum mine or platinum group metals, i.e. ruthenium, rhodium, palladium, osmium, iridium and platinum. These metals may be used alone or in combination. Platinum may be used most particularly, alone or in combination with, especially, rhodium and/or palladium and, in the case of a combination, in a predominant proportion relative to the other metal(s).

The amount of catalytic element, for example a precious metal, may be, for example, between 0.05% and 10% and preferably between 0.1% and 5%, this amount being expressed as mass of metal in metallic form relative to the mass of composition plus catalytic element as a whole.

However, as indicated previously, this catalytic element may be absent or present in very small amounts, especially less than 0.05%, when the composition comprises elements P that promote the oxidation of NO to $NO_2$, such as manganese and/or iron.

The metal described previously may be introduced into the composition of the invention via any known method, for example by impregnation of the composition with an aqueous solution containing the precursor of said catalyst as an amino complex of platinum.

The gases that may be treated by the present invention are, for example, those derived from gas turbines, from power station boilers or from internal combustion engines. In the latter case, they may especially be diesel engines or petrol engines running on a lean mixture.

The composition used in the process of the invention functions as an NOx trap when it is placed in contact with gases that have a high oxygen content. The term "gases with a high oxygen content" means gases that have an excess of oxygen relative to the amount required for the stoichiometric combustion of fuels or combustibles, and more specifically gases that have an excess of oxygen relative to the stoichiometric value $\lambda=1$. The value $\lambda$ is correlated to the air/fuel ratio in a manner that is known per se, especially in the field of internal combustion engines. Such gases are those from a motor running on a lean mixture (lean burn) and which have an oxygen content (expressed by volume) of at least 2%, and also those that have an even higher oxygen content, for example gases from engines of the diesel type, i.e. of at least 5% by volume or more than 5%, more particularly of at least 10%, this content possibly being, for example, between 5% and 20%.

In the implementation of the process of the invention, the composition used as NOx trap may be combined with complementary pollution control systems, for instance three-way catalysts, which are efficient when the value of λ is less than or equal to 1 in the gases, or alternatively with systems for injection of hydrocarbons or with recycling of the exhaust gases (EGR system) for diesel engines.

The composition, or the catalyst containing the composition, may also be combined with other pollution control systems, for instance particle filters, oxidation catalysts, hydrodesulfurization catalysts, NOx abatement systems or devices, especially by reduction with urea or ammonia.

This composition may also be used in a device comprising a coating (wash coat) based on the composition, on a substrate of the type such as, for example, a metal monolith or a ceramic substrate.

The invention thus also relates to a device for implementing the process as described hereinabove, which is characterized in that it comprises as NOx trap the composition that has been described previously. This device may be an exhaust line mounted on a motor vehicle powered by a lean-burn diesel or petrol engine and which includes a catalytic element that comprises this composition.

Other details and advantages of the invention will emerge more clearly in the light of the examples given below, which are given solely as a guide and with reference to FIG. 1 representing the X-ray diffractograms obtained on compositions A and F described below.

In the examples below, the concentrations of elements in the composition are expressed as weight of cerium oxide ($CeO_2$) or barium oxide (BaO) relative to the total weight of the composition.

EXAMPLE 1

Preparation of a Composition A 40.0 g of boehmite (Sasol Pural SB1) are added to 320 g of demineralized water with stirring, in a beaker equipped with a magnetic bar and a pH electrode. The pH of the suspension is brought to 2 by adding nitric acid.

5.705 g of ceric nitrate solution at 250 g/l of total oxide are added to 177 g of the boehmite gel formed previously. The pH of the suspension obtained is about 1.3. This suspension is heated at 100° C. for 2 hours.

During this time, 6.90 g of barium nitrate are mixed with 120 g of demineralized water in a beaker equipped with a magnetic bar. The pH of this solution is brought to pH 1.9 by adding nitric acid.

This barium nitrate solution is then added to the suspension described above, with stirring, and is cooled.

The suspension thus obtained is atomized on apparatus of the Büchi type. The powder obtained is calcined in air at 500° C. for 2 hours.

Composition A obtained contains:

| | |
|---|---|
| $Al_2O_3$: | 75% |
| Ce: | 5% |
| Ba: | 20% |

The composition has the following properties:
Specific surface area after calcination in air at 900° C. for 2 hours: 81 $m^2/g$
Specific surface area after calcination in air at 1000° C. for 2 hours: 73 $m^2/g$.

An X-ray diffractogram was obtained on the composition calcined at 900° C. for 2 hours. It is shown in FIG. 1. The characteristic peaks of the $BaAl_2O_4$ phase are absent.

EXAMPLE 2

Preparation of Composition B

This composition was prepared according to the process described in Example 1.

Composition B contains:

| | |
|---|---|
| $Al_2O_3$: | 80% |
| Ce: | 5% |
| Ba: | 15% |

The composition has the following properties:
Specific surface area after calcination in air at 900° C. for 2 hours: 110 $m^2/g$
Specific surface area after calcination in air at 1000° C. for 2 hours: 90 $m^2/g$.

EXAMPLE 3

Preparation of Composition C

This composition was prepared according to the process described in Example 1.

Composition C contains:

| | |
|---|---|
| $Al_2O_3$: | 85% |
| Ce: | 5% |
| Ba: | 10% |

The composition has the following properties:
Specific surface area after calcination in air at 900° C. for 2 hours: 124 $m^2/g$
Specific surface area after calcination in air at 1000° C. for 2 hours: 96 $m^2/g$.

EXAMPLE 4

Preparation of Composition D 6.90 g of barium nitrate and 6.173 ml of the cerium oxide sol described in European patent 208 581 are added to 177 g of boehmite gel prepared as described in example 1 and acidified to pH 1.5 with nitric acid. The suspension is then atomized on apparatus of Büchi type. The powder obtained is calcined in air at 500° C. for 2 hours.

Composition D contains:

| | |
|---|---|
| $Al_2O_3$: | 75% |
| Ce: | 5% |
| Ba: | 20% |

The composition has the following properties:
Specific surface area after calcination in air at 900° C. for 2 hours: 101 m²/g
Specific surface area after calcination in air at 1000° C. for 2 hours: 82 m²/g.

EXAMPLE 5

Preparation of Composition E 3.457 g of cerous nitrate at 496 g/l of total oxide are placed in a beaker equipped with a magnetic bar. To this solution is added a solution of 6.90 g of barium nitrate and 120 g of demineralized water, with stirring. This solution is then added to 177 g of the boehmite gel prepared as described in example 1. The suspension thus obtained is atomized on apparatus of Büchi type. The powder obtained is calcined in air at 500° C. for 2 hours.
Composition E contains:

| | |
|---|---|
| $Al_2O_3$: | 75% |
| Ce: | 5% |
| Ba: | 20% |

The composition has the following properties:
Specific surface area after calcination in air at 900° C. for 2 hours: 102 m²/g
Specific surface area after calcination in air at 1000° C. for 2 hours: 86 m²/g.

The diffractograms obtained for compositions B to E after calcination at 900° C. for 2 hours in air, not shown in the present text, do not comprise peaks characteristic of the $BaAl_2O_4$ phase and are similar to that obtained for composition A.

COMPARATIVE EXAMPLE 6

Preparation of a Composition F Via a Dry Impregnation Process

A solution containing 3.45 g of barium nitrate (Prolabo Rectapur 99%), 17.5 g of demineralized water and 1.729 g of a cerous nitrate solution at 496 g/l of total oxide is heated to 80° C. in a beaker equipped with a magnetic bar.
This solution is impregnated at 80° C. onto 15.69 g of alumina obtained by calcination of an SBI boehmite gel of example 1) 1000 in air for 2 hours.
The impregnated alumina is then dried at 100° C. for 3 hours. This procedure is repeated a second time with the same amount of the solution of barium nitrate and of cerous nitrate at 80° C. The alumina thus obtained is dried at 100° C. for 3 hours. The powder obtained is calcined in air at 500° C. for 2 hours.

| | |
|---|---|
| $Al_2O_3$: | 75% |
| Ce: | 5% |
| Ba: | 20% |

The composition has the following properties:
Specific surface area after calcination in air at 900° C. for 2 hours: 69 m²/g
Specific surface area after calcination in air at 1000° C. for 2 hours: 67 m²/g.

The diffractogram obtained for composition E after calcination at 900° C. for 2 hours in air, shown in FIG. 1, comprises the peaks characteristic of the $BaAl_2O_4$ phase.

EXAMPLE 7

Catalytic Test

This example gives the results of measurement of the NOx storage capacity of catalytic compositions containing 1% by weight of platinum prepared from the compositions of the preceding examples and in the following manner.
5 g of compound according to one of the above examples are introduced into a beaker and then covered with water (50 ml), followed by addition of a solution of platinum tetraamine hydroxide salt (3.125 ml at 16 g/l). After evaporating on a rotary evaporator, the catalytic composition thus obtained is dried for 2 hours in an oven at 120° C., and then calcined at 500° C. in air for 2 hours and matured at 700° C. in a 90% air/10% $H_2O$ mixture for 4 hours.
Measurement of the NOx storage capacity is performed under the following conditions:
The catalytic composition as prepared above is introduced into a reactor and then pretreated at 300° C. for 12 hours in a gas stream having the following composition:
(9% $O_2$+10% $H_2O$+2% $SO_2$+79% $N_2$ (corresponding to 1000 ppm $SO_2$).
The reactor is isolated and then cooled to room temperature under a stream of $N_2$. This catalytic composition thus sulfated is introduced into a new reactor and heated from a temperature of 150° C. to a temperature of 600° C. under a stream of reducing gas having the following composition:
(4.9% $O_2$+10% CO+5% $CO_2$+10% HC (2500 pm of $C_3H_6$+2500 pm of $C_3H_8$ in $N_2$)+5% $H_2O$+65.1% $N_2$).
The catalytic composition as prepared above is then maintained under this reductive stream for 20 minutes at a temperature of 600° C.
The aim of this treatment is to simulate a sulfatation-desulfatation cycle:
the reactor is isolated and then cooled statically to room temperature,
the reaction stream, having the composition: 10% $O_2$+5% $H_2O$+10% $CO_2$+300 ppm NO in nitrogen, analyzed continuously by a Magna 560 Nicolet Fourier transform infrared (FT-IR) spectrometer, is introduced into the catalytic reactor, which has been placed beforehand at the desired reaction temperature, after stabilization of the analysis (NO+$NO_2$);
the respective concentrations of NO and $NO_2$ at the reactor outlet are determined continuously by the FTIR spectrometer;
integration of the concentrations of NO and $NO_2$ over the minute following the arrival of the reaction stream onto the catalytic composition makes it possible to calculate the amount of NOx trapped. The results are expressed as the amount by mass of NOx trapped (%) at 1 minute, relative to the amount of NOx fed in;
measurements are then taken on other samples of catalytic compositions at the desired temperatures.
The amounts of NOx trapped at temperatures of 200° C., 300° C., 350° C. and 400° C. are reported in table 1. The catalytic compositions 1 and 2 of this table correspond, respectively, to the products obtained after impregnation with platinum, according to the process described previously for composition A (test 7a) and for composition F (comparative test 7b).

TABLE 1

| | NOx trapped in weight % | | | | |
|---|---|---|---|---|---|
| Test | 200° C. | 250° C. | 300° C. | 350° C. | 400° C. |
| 7a | 86 | 90 | 100 | 85 | 85 |
| 7b | 51 | 80 | 86 | 85 | 85 |

It is seen from the results of table 1 that the composition of the invention has maximum efficacy throughout the temperature range between 200° C. and 400° C., whereas this maximum efficacy is rather towards 300° C. and 400° C. for the comparative composition F. The catalytic composition of the invention is thus particularly efficient throughout the temperature range and especially at low temperatures, from 200° C. to 300° C. and better still at 200° C. and 250° C.

The invention claimed is:

1. A device for trapping nitrogen oxides (NOx), comprising a coating of a composition on a substrate, wherein the composition comprises alumina, cerium and a metal element M selected from the group consisting of barium, strontium and a combination of these two elements, wherein the metal element M is present in the composition in an amount of at least 10% by weight expressed as weight of oxide of the element M relative to the total weight of the composition, wherein the cerium is present in the composition in an amount between 2 and 15% by weight, inclusive, expressed as cerium oxide relative to the total weight of the composition, wherein the composition has a specific surface area of at least 90 m$^2$/g after calcination at 900° C. for 2 hours, wherein the cerium is in the form of cerium oxide particles with a mean size of not more than 10 nm, after calcination in air at a temperature of 1000° C. for 2 hours, and with the proviso that the compound of formula MAl$_2$O$_4$ is not detectable by X-ray diffraction in a composition after calcination in air at a temperature of 700° C. for 2 hours.

2. The device as defined by claim 1, wherein the composition is devoid of cerium oxide aggregates greater than 100 nm in size.

3. The device as defined by claim 1, wherein the composition is in the form of a powder, granules, beads, an extrudate, or a honeycomb thereof.

4. The device as defined by claim 1, wherein after calcination at 900° C. for 2 hours, the cerium is in the form oxide particles with a mean size of not more than 7 nm.

5. The device of claim 1, wherein the substrate is a metal monolith substrate or a ceramic substrate.

6. The device of 1, wherein the device is an exhaust line.

7. The device as defined by claim 1, wherein concentration of element M ranges from 10% by weight to 25% by weight of oxide of said element M relative to the total weight of the composition.

8. The device as defined by claim 7, wherein the concentration of element M ranges from 15% to 22% by weight.

9. The device as defined by claim 1, wherein the composition has a specific surface area at least equal to 70 m$^2$/g after calcination at 1,000° C. for 2 hours.

10. The device as defined by claim 9, wherein the composition has a specific surface area at least equal to 80 m$^2$/g after calcination at 1,000° C. for 2 hours.

11. The device as defined by claim 1, wherein concentration of cerium expressed as weight of cerium oxide relative to the total weight of the composition is greater than or equal to 2% by weight.

12. The device as defined by claim 1, wherein the composition is devoid of any compound of formula MAl$_2$O$_4$ that is detectable by X-ray diffraction in a composition after calcination at 800° C. for 2 hours in air.

13. The device as defined by claim 1, wherein the composition is devoid of any compound of formula MAl$_2$O$_4$ that is detectable by X-ray diffraction in a composition after calcination at 900° C. for 2 hours in air.

14. The device as defined by claim 1, wherein the cerium is present in the form of an oxide and/or of a solution thereof in alumina, and wherein the element M is present in the form of an oxide and/or of a carbonate and/or of a solid solution thereof in alumina.

15. The device as defined by claim 1, wherein the composition comprises at least one metal element P selected from the group consisting of rare-earth metals, potassium, magnesium, iron, zirconium, manganese, calcium, and combination of such elements.

16. The device as defined by claim 15, wherein the weight concentration of cerium and of element P, expressed as weight of oxide, ranges from 5% to 15% of the total composition, and the concentration of cerium, expressed as oxide, is greater than or equal to 2% by weight relative to the total weight of the composition.

17. The device as defined by claim 15, wherein said at least one element P is selected from the group consisting of lanthanum, praseodymium, neodymium, yttrium, calcium, potassium, manganese, iron, and combination thereof.

18. The device as defined by claim 5, wherein said at least one element P is present in the form of an oxide and/or a carbonate and/or of a solution thereof in alumina and/or in cerium oxide.

19. The device as defined by claim 1, wherein the device further comprises a catalytically active element deposited onto the composition.

20. The device as defined by claim 19, wherein the catalytically active element is selected from the group consisting of precious metals, platinum, and platinum group metals.

21. The device as defined by claim 20, wherein the catalytically active element is selected from the group consisting of platinum, palladium, rhodium, and combination thereof.

22. The device as defined by claim 15, wherein the device further comprises a catalyst useful for the oxidation of nitrogen oxides and wherein said at least one element P is selected from the group consisting of iron, manganese and combination thereof.

23. The device as defined by claim 20, wherein the catalytically active element is selected from the group consisting of platinum and platinum group metals.

24. A process for preparing the composition in the device as defined by claim 15, comprising:
    forming a mixture in liquid phase which comprises soluble or sol/gel compounds of cerium, an alumina precursor and soluble or sol/gel compounds of the element M, and soluble or sol/gel compounds of the at least one element P;
    heating said mixture;
    recovering the product thus formed; and
    calcining said product.

25. The process as defined by claim 24, wherein said soluble or sol/gel compounds of the element M and/or of the element P are added to the mixture after the step of heating the initial mixture.

26. The process as defined by claim 24, wherein the recovery of the product is obtained by atomizing the mixture containing cerium, alumina, the element M and the element P.

27. A process for preparing the composition in the device as defined by claim 15, comprising:

preparing a mixture in liquid medium containing an alumina precursor, a soluble compound or a sol/gel of cerium, a soluble compound or a sol/gel of element M and a soluble compound or a sol/gel of element P;
recovering the product thus formed; and
calcining said product.

28. The process as defined by claim 27, wherein the recovery of said product is performed by atomizing the mixture.

29. A process for preparing the composition in the device as defined by claim 1, comprising:
forming a mixture in liquid phase which comprises soluble or sol/gel compounds of cerium, an alumina precursor, and soluble or sal/gel compounds of the element M;
heating said mixture;
recovering the product thus formed; and
calcining said product.

30. A process for the treatment of a vehicular exhaust gas and trapping NOx therefrom, comprising contacting the exhaust gas with the device as defined by claim 1.

31. The device of claim 1, wherein M is strontium.

* * * * *